United States Patent [19]

Cotillier

[11] Patent Number: 4,649,744
[45] Date of Patent: Mar. 17, 1987

[54] FISH LOCATOR PROBE

[76] Inventor: Jim Cotillier, 343 W. Woodbury Rd., Altadena, Calif. 91001

[21] Appl. No.: 610,710

[22] Filed: May 16, 1984

[51] Int. Cl.⁴ .................................. G01D 21/00
[52] U.S. Cl. ....................................... 73/170 A
[58] Field of Search ................. 73/170 A, 290 R; 441/21, 28, 29, 33; 114/313, 330, 331

[56] References Cited

U.S. PATENT DOCUMENTS

| | | |
|---|---|---|
| 1,917,967 | 7/1933 | Green . |
| 2,675,776 | 4/1954 | Tuve . |
| 2,810,229 | 10/1957 | Allyn . |
| 2,869,279 | 1/1959 | Pretorius . |
| 2,928,202 | 3/1960 | Smerke . |
| 2,968,053 | 1/1961 | Gogolick et al. . |
| 3,047,975 | 8/1962 | Pretorius . |
| 3,052,205 | 9/1962 | Taslitt et al. . |
| 3,082,400 | 3/1963 | Coop .................. 73/170 A |
| 3,093,107 | 6/1963 | Grand et al. . |
| 3,170,438 | 2/1965 | Nadler et al. . |
| 3,280,549 | 10/1966 | Hsu . |
| 3,439,537 | 4/1969 | Pullos ................. 73/170 A |
| 3,478,437 | 11/1969 | Cothran .............. 73/170 A |
| 3,496,906 | 2/1970 | Gerke . |
| 3,834,229 | 9/1974 | White ................. 73/170 A |
| 3,936,895 | 2/1976 | Talkington .......... 73/170 A |
| 3,952,349 | 4/1976 | Erath .................. 73/170 A |
| 3,972,231 | 8/1976 | Richardson ......... 73/170 A |
| 4,077,151 | 3/1978 | Johnson . |
| 4,258,568 | 3/1981 | Boetes ................ 73/170 A |
| 4,307,605 | 12/1981 | Niskin . |

Primary Examiner—Charles Frankfort
Assistant Examiner—Denis E. Corr
Attorney, Agent, or Firm—Cushman, Darby & Cushman

[57] ABSTRACT

A probe generally rocket-like in shape includes a forward leading nose section containing a radio transmitter with an antenna permanently attached thereto which is fixed to a central housing section possessing a generally cross-sectionally square bore followed by a trailing finned section continuing the bore. A motor assembly including an electric motor having opposed shafting (one end of the shaft defines a cutting tool and the opposite end of the shaft defines a plurality of threads) is slideably disposed in a watertight chamber. The motor assembly, retained in a first position by the engagement of the threaded shaft with the body, is biased toward a second position by a compression spring. A sensing array of position sensing switches senses deviations in the descent of the probe in the water. The motor rotates the shaft to disengage the shaft from body in response to the sensed deviations. If sufficient deviations over time occur, the threads of the shaft disengage from the body and the motor assembly moves to its second position, thereby shifting the center of gravity of the probe. The probe inverts, causing ballast to detach from the probe to make the probe buoyant. The transmitter emits a signal while the probe floats on the surface. The cutting tool on the opposite end of the shaft eventually pierces a plug, filling the chamber with water and scuttling the probe. If insufficient deviations occur, the probe sinks to the bottom and implodes.

18 Claims, 6 Drawing Figures

U.S. Patent  Mar. 17, 1987  Sheet 2 of 2  4,649,744
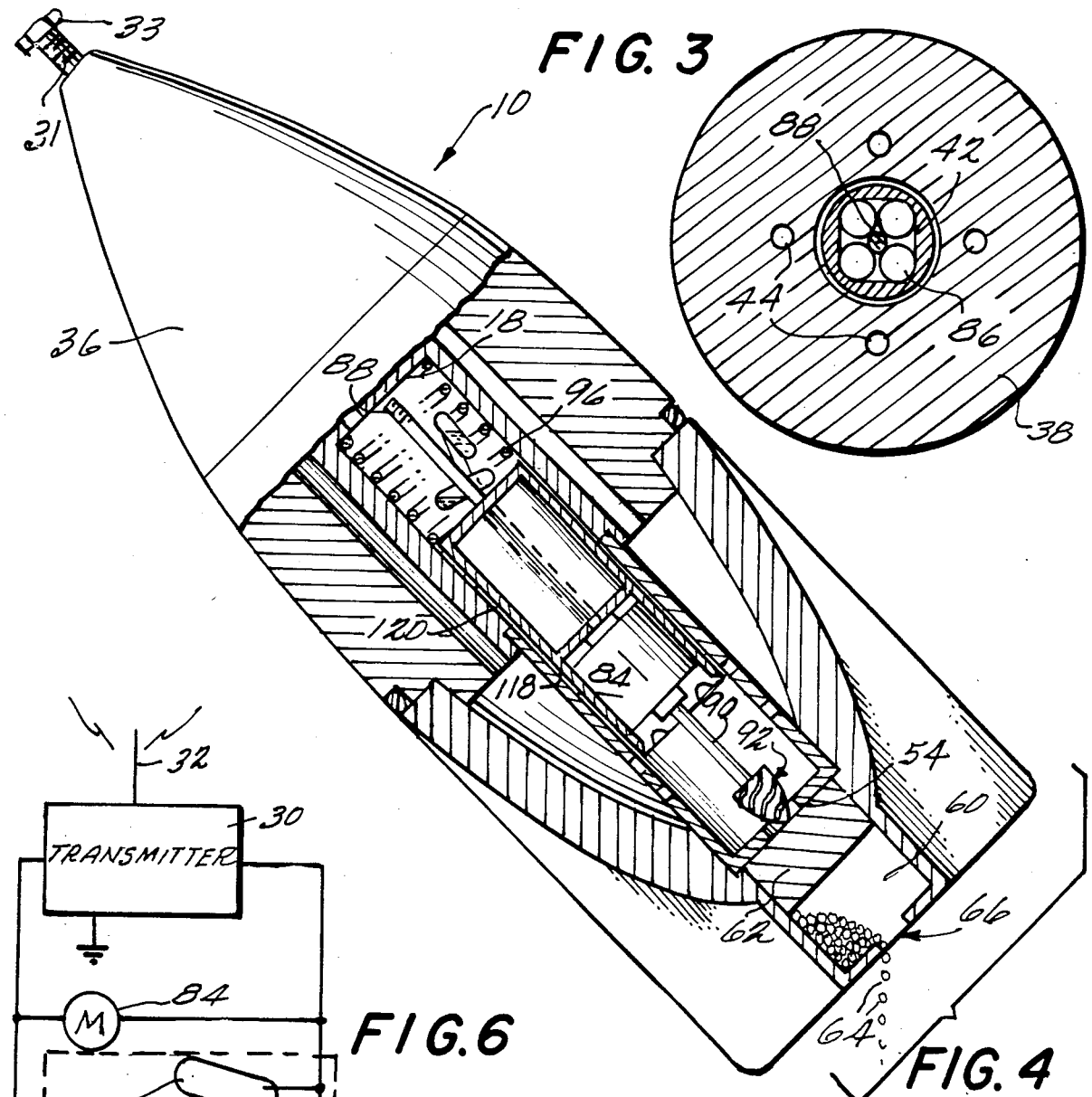
FIG. 3
FIG. 4
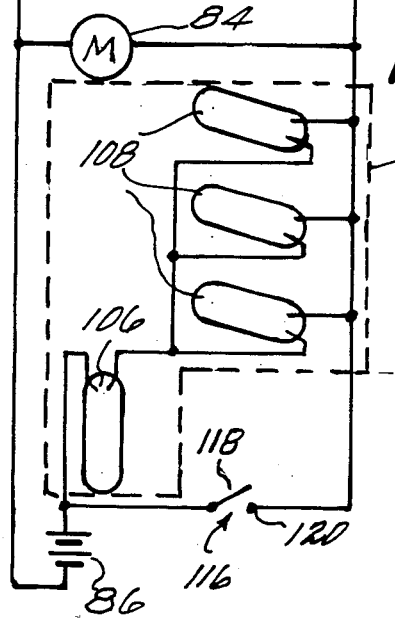
FIG. 6
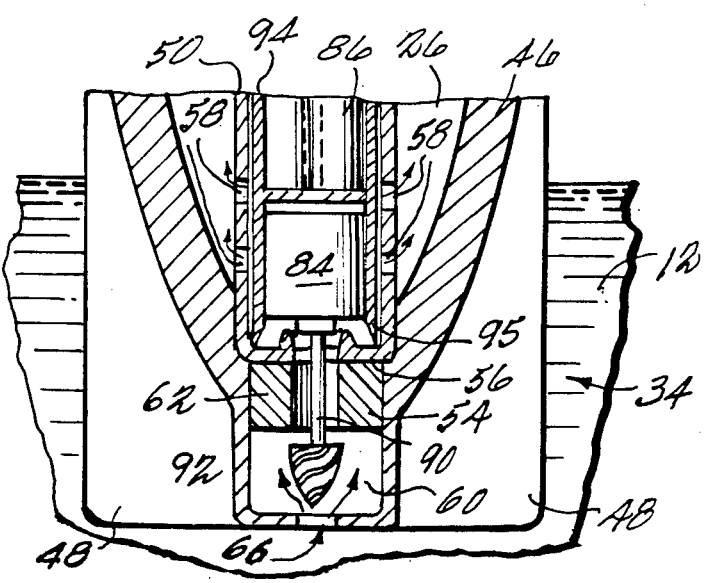
FIG. 5

FISH LOCATOR PROBE

FIELD OF THE INVENTION

The present invention relates generally to the detection of moving underwater objects. In particular, the invention relates to the underwater detection of turbulence and flow disturbances created in proximity with such objects and the subsequent transmission of the location of the objects.

BACKGROUND OF THE INVENTION

It is often desirable to locate the position of objects moving beneath the surface of the ocean. Fishermen wish to track the positions of large schools of fish; the military wishes to detect the presence of underwater activity such as submarine and diver movement; oceanographers desire to locate underwater eddies and currents. Unfortunately, such underwater activity typically cannot easily be detected from the surface of the ocean.

A major problem which commercial fishing fleets constantly confront is the inability to locate schools of fish. The location of migratory schools of fish presently involves a great deal of guess-work and intuition. Great efforts have been expended to more determinatively locate the position of highly migratory schools of fish such as tuna. For instance, water temperature and currents may be measured and analyzed in order to provide possible indications of areas of the sea in which a school might be found. Known positions of schools in the past are often, used as indications of the present position of the schools. Data is subjected to computer analysis in order to provide more determinative results. However, since little is known about the migration patterns of schools of fish, a fishing captain's sixth sense is often far more reliable than data produced from the analysis of the above parameters.

An alternate and more reliable way to locate schools of fish is to actually sense their presence. Sonar or radar is often used to detect the presence of a large school of fish. It is typically impractical to deploy large numbers of such detecting devices because of the large expense involved and the short life span of the devices due to the harshness of the sea environment. Sensing systems are sometimes placed aboard helicopters or other aircraft which fly over the surface of the sea in search of schools of fish, but aircraft are usually prohibitively expensive to operate and can only be in one place at a time.

The U.S. Navy has developed extremely sophisticated techniques and systems for detecting the presence of enemy submarines. The oceans of the world are constantly subjected to surveillance in an effort to detect and track submarine movement. However, these systems are extremely expensive and are not totally reliable in detecting submarines traveling many hundreds of feet below the surface.

The prior art discloses buoys or other bodies requiring external connection (using a wire or line, floatation or anchoring gear, etc.). Prior art devices are generally relatively expensive, and could not reasonably be expected to be expendable or disposable after a one-time use. Some prior-issued United States patents related to the present invention include U.S. Pat. No. 3,052,205, U.S. Pat. No. 2,968,053, U.S. Pat. No. 3,093,107 and U.S. Pat. No. 4,307,605.

There therefore exists a need for an expedient way to determine the presence of significant underwater activity using inexpensive, expendable sensing devices. A cost-effective system permitting reconaissance of vast areas of the sea to locate spots of relatively high underwater activity (such as that created by migratory schools of fish or the movement of a submarine) could direct a surface fleet to travel directly to the location of the activity. A low cost means of reporting abnormal under-surface activity on a one shot basis from the sea floor (for example, near fish traps and weirs) would also be very desirable.

SUMMARY OF THE INVENTION

A body having a density exceeding the density of a fluid is disposed in the fluid such that the body descends along a trajectory beneath the surface of the fluid due to the force of gravity. The amount which the body deviates from the trajectory over time is sensed. The density of the body is decreased to less than that of the fluid if the sensed amount of deviation over time exceeds a predetermined value, thereby causing the body to rise to the surface of the fluid. A signal may be emitted for a first predetermined time interval after the body rises to the surface. The density of the body may be increased to exceed the density of the fluid after a second predetermined time interval after the body rises to the surface, thereby causing the body to sink beneath the surface. Thus, the body will not initially rise to the surface but will instead continue to descend if no turbulence which changes the trajectory of the body is sensed. However, if turbulence (such as that created by traveling schools of fish, a submarine, the swimming of underwater divers, etc.) is detected, the body will rise to the surface, emit a signal, and then finally scuttle itself and sink below the surface.

Ballast may be detachably disposed on the body to cause the body to have a density exceeding the density of the fluid. The ballast may detach from the body when the body assumes a second predetermined orientation different from the first predetermined orientation in which the body descends below the surface. The body may also include a watertight chamber which may be evacuated. A unitary device may perform three functions: determining when the quantity of sensed deviations of the body from the trajectory over time exceeds a predetermined amount; changing the orientation of the body from the first orientation to the second orientation when the quantity of sensed deviations exceeds the predetermined amount (thereby causing the ballast to detach from the body so that the body floats to the surface); and filling the chamber with fluid a predetermined time after the body floats to the surface (thereby increasing the density of the body to greater than the density of the fluid to cause the body to sink).

The unitary device may include a motor disposed within the chamber and movable to a first and a second position, the position of the motor changing the center of gravity of the body such that the body assumes the first orientation when the motor is in the first position and the body assumes the second orientation when the motor is in the second position. The motor produces rotational energy in response to the sensed deviations. A position retaining device rotationally coupled to the motor engages with the body and retains the motor in the first position. The position retaining device may disengage the motor from the body when the motor produces a first predetermined angular displacement. A biasing device biases the motor toward its second position. A cutting device, rotationally coupled to the motor, may cut an orifice in a wall of the body separating the chamber from the fluid when the motor produces a second predetermined angular displacement when in its second position, thereby scuttling the body.

The present invention thus provides a safe, dependable and inexpensive device which can be deployed in a variety of different ways and reliably locates the position of underwater moving objects such as schools of fish. Multifunctional components are used for simplicity, resulting in a high degree of reliability and compactness, inherent mode programming and cost efficiency. The device is not intended to be retrieved and automatically scuttles itself, thereby reducing water pollution and saving the cost of recovering the device. Large numbers of probes in accordance with the present invention may be deployed at little cost, enabling vast areas of the sea to be searched. The present invention is principally useful for detecting the presence of schools of fish, but lends itself to many other uses (such as detecting the presence of submarines and other underwater military activity, detecting underwater inlet and outlet flows, bottom sounding, current measurement, obstruction location, activity in proximity with fish traps and weirs, etc.).

BRIEF DESCRIPTION OF THE DRAWINGS

These and other objects and advantages of the present invention will be better and more completely understood by reading the following detailed description of an exemplary embodiment in conjunction with the accompanying drawings, of which:

FIG. 3 is a top view in cross section taken through the central housing of the embodiment in shown in FIG. 2;

FIG. 4 is a side elevational view in cross section of the embodiment shown in FIG. 2 operating in a mode such that it will float to the surface;

FIG. 5 is a detailed side elevational view in cross section of the tail section of the embodiment shown in FIG. 2 operating in a mode such that it will sink beneath the surface after floating to the surface; and FIG. 6 is a schematic and block diagram of the electrical system of the embodiment shown in FIG. 2.

DETAILED DESCRIPTION OF THE PREFERRED EMBODIMENT

Figure 1:
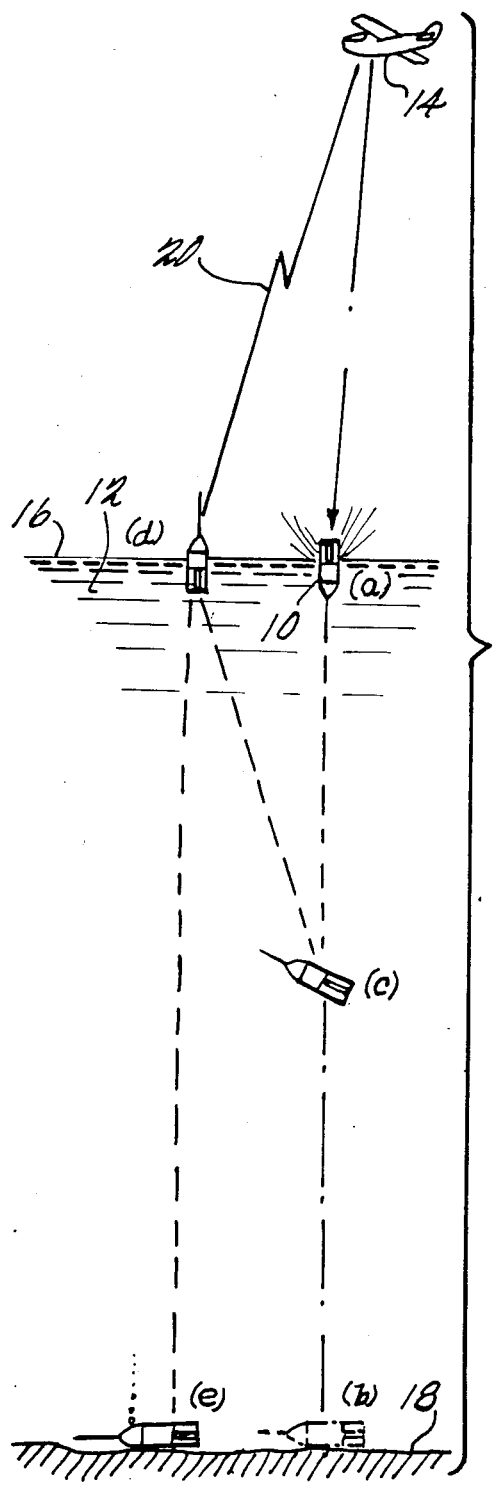
FIG. 1 is a graphical depiction of one method of deploying the presently preferred exemplary embodiment of the present invention.

A graphical view of the function of the presently preferred exemplary embodiment of the present invention is shown in FIG. 1. The present invention comprises an expendable probe 10 which is adapted for submersion into the water 12. Probe 10 may be deployed in any convenient manner, such as by dropping it from an aircraft 14 (position a). Probe 10 initially has a density which exceeds the density of water 12 so that it sinks beneath the surface 16 of the water along a predetermined trajectory under the force of gravity. Of course, the path of descent of probe 10 will be effected by currents and turbulence (such as that caused by a traveling school of fish or a moving submarine) in the water 12. If the amount of turbulence which probe 10 encounters as it descends is less than a predetermined amount, the probe will continue to descend until it rests on the sea floor 18 (position b). However, if probe 10 encounters an amount of turbulence above a predetermined level, it will automatically decrease its density to less than that of water 12 (position c), and will ascend to the surface of water 12 (position d). Probe 10 remains floating on the surface 16 of water 12 for a predetermined time period, during which time it transmits a signal 20 to permit its location. After a predetermined time interval, probe 10 automatically increases its density to greater than the density of water 12, causing it to sink beneath the surface of the water and to finally come to rest on sea floor 18 (position e).

Another method (not shown) of deploying probe 10 is to detachably connect it (such as by a hook) to a drop line (comprising, for example, a steel wire or other filament attached on one end to a floating buoy and on the other end to a submerged weight). Several probes 10 could be connected to the same drop line at different depths. When the turbulence beneath the surface of water 12 over time exceeds a predetermined amount, probe 10 will become buoyant (position c), thereby detaching itself from the drop line and ascending to the surface. Alternatively, probe 10 may be detachably anchored to sea floor 18 (such as by a vertical stiff wire stand extending from the sea floor) and will detach and float to the surface if the underwater activity in the vicinity of the probe increases beyond a predetermined degree.

Figure 2:
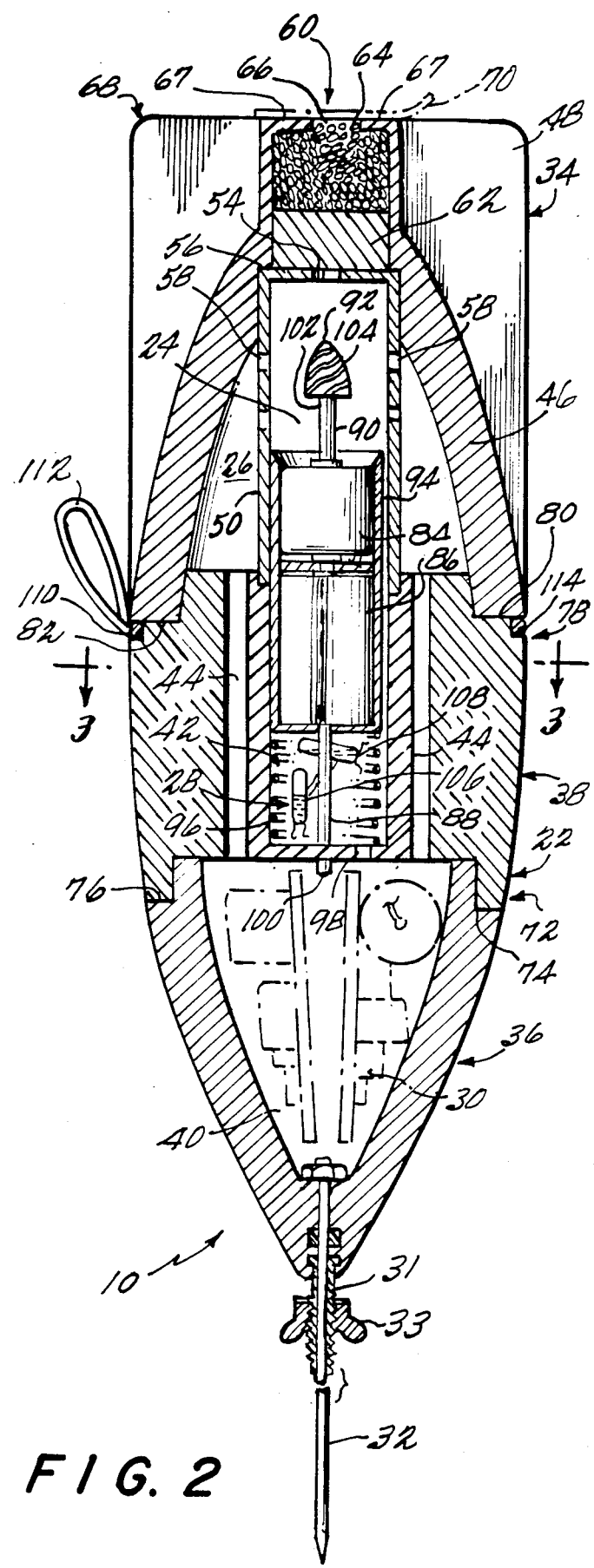
FIG. 2 is a side elevational view in cross section of the presently preferred exemplary embodiment of the present invention operating in a mode such that it will descend below the surface.

A side elevational view in cross section of probe 10 is shown in FIG. 2. Probe 10 mainly comprises a body 22, a unitary motor assembly 24 (the function of which will be described in greater detail shortly) disposed in an evacuated watertight cavity 26, a sensing array 28 and a radio transmitter 30. Transmitter 30 produces an electromagnetic signal in the radio frequency spectrum which is coupled to and radiated by an antenna 32. In the preferred embodiment, antenna 32 is flexible to permit it to be bent back to a position adjacent to probe 10 during storage of the probe, and then bent to a position axial to the probe for operation. Transmitter 30 in the preferred embodiment is a compact, lightweight radio transmitting device conventional in design, and produces a low-power radio signal which is transmitted into the air when probe 10 is floating on the surface of the water (position d shown in FIG. 1). Transmitter 30 may produce a coded signal uniquely identifying probe 10 if desired. Since the design and construction of transmitter 30 is well known to one of ordinary skill in the art, the transmitter need not be discussed in detail here. It should be noted that the operation of transmitter 30 should be in accordance with applicable national and international laws governing the transmission of radio frequency signals.

Body 22 of the preferred embodiment of probe 10 comprises three sections: a tail section 34, a nose cone 36 and a central housing 38. The various sections of body 22 may be composed of any material providing the desired tensile strength, density and machinability (in the presently preferred embodiment, tail section 34, nose cone 36 and central housing 38 are molded of plastic construction). Those skilled in the art will, of course, appreciate that body 22 could be constructed in many other ways, and the present invention is by no means limited to any one body configuration.

Nose cone 36 is substantially conical in shape (in order to streamline probe 10 to reduce friction upon impacting the surface 16 of the water with the air while probe 10 is falling through the air and to reduce friction with the water. A central watertight cavity 40 is defined within the center of nose cone 36 to house transmitter 30. Central housing 38 is substantially cylindrical in shape and includes a centrally defined bore 42. Bore 42 defines a rectangle with rounded edges in the preferred embodiment when viewed in cross section (as is shown best in FIG. 3), the reason for which will be explained shortly. Central housing 38 also includes a plurality of passages 44 disposed about its periphery (four in number in the preferred embodiment) extending through the entire length of the central housing. The function of passages 44 is to connect cavity 40 of nose cone 36 with cavity 26 of tail section 34.

Tail section 34 comprises a substantially conical outer wall 46 positioned about the periphery of which are a plurality of radially equally-spaced anti-torsion stabilizing fins 48 (suitably four in number). Fins 48 stabilize the trajectory of probe 10 as it descends through the air and the water 12 to keep the probe in a nose-down attitude. A substantially conical cavity 26 is defined within tail section 34. Fixedly disposed within cavity 26 is a sleeve 50 (composed of steel or some other smooth material having suitable properties of machinability). Sleeve 50 is substantially rectangular in cross section (as is bore 42) and defines a hollow cylinder with flat edges and in registration with bore 42. The hollow space defined within sleeve 50 forms an extension of the bore. Sleeve 50 defines a circular hole 54 at an extremity 56, and a plurality of vent holes 58 spaced along its side walls which open into cavity 26.

Cavity 26 also includes a cylindrical chamber 60 in which are disposed a plug 62 and a quantity of ballast 64. Plug 62 comprises a relatively soft water-resistant material which can be relatively easily cut through. Plug 62 seals cavity 26 and sleeve 50 from an opening 66 defined into an end wall 67 located at an extremity 68 of tail portion 34, preventing water from entering cavity 26 through opening 66. A predetermined quantity of ballast 64 (which may comprise any dense granular material such as number 8 lead shot or sand) is disposed in the portion of chamber 60 not occupied by plug 62 and may be jettisoned through opening 66. The size of opening 66 is small enough with respect to end wall 67 so that the end wall provides a blockage to prevent ballast 64 from escaping through the opening except when probe 10 is oriented substantially in a tail-down position. When probe 10 is being stored, a piece of removable adhesive tape 70 adhering to end wall 67 and covering opening 66 retains ballast 64 within chamber 60.

Central housing 38 defines at one extremity 72 a flange 74 which mates with a cooperative flange 76 integral to nose cone 36. Likewise, central housing 38 at the other extremity 78 defines a flange 80 which mates with a cooperative flange 82 integral to tail piece 34. Tail section 34, central housing 38 and nose cone 36 may be assembled together as one integral body 22 such that the cavity defined within sleeve 50 is continuous with and in registration with cavity 42, and cavity 26 is connected to cavity 40 via passages 44. The center of gravity of body 22 (excluding motor assembly 24) lies approximately about the centroid of mass of the body.

Motor assembly 24 comprises an electric motor 84, a battery pack 86, a first output shaft 88, a second output shaft 90 and a cutting head 92. Motor 84 and battery pack 86 are housed in a thin-walled inner sleeve housing 94 (comprising molded plastic or potting material) which holds the motor and the battery pack immobile with respect to one another. Motor 84 is a conventional low-power electrical motor. Battery pack 86 in the preferred embodiment comprises a plurality of minature conventional low-voltage electrochemical cells which are clustered about shaft 88 (as in best shown in FIG. 3).

Motor assembly 24 is slideably disposed within cavity 42 and is movable between a first position (shown in FIG. 2) and a second position (shown in FIG. 4). The position of the mass of motor assembly 24 with respect to body 22 affects the center of gravity of the body so that when motor assembly is in its first position (as shown in FIG. 2) probe 10 will descend in water 12 with its nose cone 36 facing sea floor 18. However, when motor assembly 24 is moved to its second position (as shown in FIG. 4), the center of gravity of body 22 changes so that nose cone 36 is directed toward the surface 16 of water 12.

Motor assembly 24 is biased toward its second position by a compression spring 96 which is disposed within cavity 42 between the motor assembly and a wall portion 98 disposed at the first extremity 72 of central housing 38. First output shaft 88 and second output shaft 90 of motor 84 are rotationally coupled to the motor and rotate in the same direction. Motor assembly 24 cannot itself rotate due to the square (rather than circular) shape of bore 42 and the hollow space defined within sleeve 50. First output shaft 88 has defined thereon a plurality of threads 100 which engage with a threaded aperture (not shown) centrally defined within wall portion 98. First output shaft 88 retains motor assembly 24 in its first position despite the biasing force of spring 96 due to the engagement of threads 100 with wall portion 98. However, when first output shaft 88 is rotated a predetermined number of turns by motor 84, the threads 100 of the shaft disengage from wall portion 98, and motor assembly 24 travels to its second position under the force of spring 96.

Second output shaft 90 is rotationally coupled to motor 84 (shaft 90 and shaft 88 may be one integral shaft) and is fixed (suitably by brazing) at its extremity 102 to a cutting head 92. Cutting head 92 is substantially conical in shape and defines a plurality of flutes 104 with sharpened edges for cutting through plug 62. The largest circular cross section of cutting head 92 is smaller than opening 54 and cutting head is in registration with opening 54 so that the cutting head may directly contact plug 62 when motor assembly 24 is in its second position, and need not cut through sleeve 50. Cutting head 92, when rotated by motor 84, cuts an aperture in plug 62 to permit water 12 to enter the various cavities defined by body 22 (as will be further explained shortly).

Sensor array 28 in the preferred embodiment comprises at least one mercury switch 106 which is fixedly mounted to motor assembly 24 in an orientation which is axial with respect to the direction of elongation of body 22, and a plurality (suitably three) of mercury switches 108 which are each mounted in an orientation which is substantially perpendicular to the directions of elongation. Mercury switches 106 and 108 may be retained in position in any convenient manner (such as with epoxy putty, brackets, etc.). Sensor array 28 detects changes in the orientation of probe 10 as it descends in water 12 (the operation of sensor array 28 will be further explained shortly).

To assemble probe 10, central housing 38 is securely inserted into an elevated assembly fixture (not shown)

with extremity 72 facing vertically upward. The mating flange 76 of nose cone 36 is treated with a permanent watertight adhesive sealant and is lowered onto mating flange 74 of the central housing 38. Electrical wiring (not shown) connecting transmitter 30 to battery pack 86 and its associated switches is guided through a feed-through hole (not shown) in wall portion 98.

First compression spring 96 and then motor assembly 24 are inserted into cavity 42 from the side of extremity 78 of central housing 38. The wiring connecting transmitter 30 to battery pack 86 (the exact connections of which will be discussed in greater detail in conjunction with FIG. 6) is connected to appropriate points in a conventional matter. Cutting head 92 is manually rotated a predetermined number of turns to engage first output shaft 88 with the threaded aperture (not shown) defined in wall portion 98. Mating flange 82 of tail section 34 is treated with a permanent waterproof adhesive sealant and tail section 34 is pressed into position such that flanges 80 and 82 mate together.

Prior to placement of tail section 34, a harness ring 110 including an engaging hook 112 may be positioned in an annular depression 114 defined in extremity 78 of central housing 38. Engaging ring 112 may engage with a hook projecting from a drop line or a stand extending from sea floor 18, as was previously discussed.

The air is evacuated from chamber 26 (with a conventional vacuum pump) and plug 62 (comprising a fusible material such as lead or tar) is poured through opening 66 to seal opening 54. Ballast 64 is poured into cavity 60 through opening 66 to fill cavity 60, and adhesive tape 70 is placed into position on end wall 67. Probe 10 may be placarded with a decal "KEEP UP" with an arrow facing toward nose cone 36 in order to indicate the orientation of the probe for storage. Probe 10 is now complete and ready to use.

In the preferred embodiment, the buoyancy and center of gravity of completed probe 10 can be adjusted after assembly by varying the amount of ballast 64 and changing the position of a wing nut 33 which is engaged with a threaded plug 31 extending axially from nose cone 36 (and surrounding antenna 32 for a portion of the length of the antenna). Of course, those skilled in the art could readily devise other ways to adjust the center of gravity (such as by adhering lead weights to the exterior surfaces of the probe).

FIG. 6 shows a schematic and block diagram of the electronic circuitry of probe 10. Mercury switch 106 (which is fixed in an axial position with respect to the probe i.e. along the direction of elongation) is connected in series with a plurality of mercury switches 108 (suitably three in number) which are fixed in a positon perpendicular to the axis of elongation of the probe and connected together in parallel. Mercury switches 106 and 108 are conventional in construction, and include a bead of mercury which makes electrical contacts between two contacts disposed in the switch only when the switch assumes a predetermined orientation. Transmitter 30 and motor 84 are connected together in parallel; the transmitter and the motor together are connected in series with battery pack 86 and sensor array 28. Mercury switch 106 (a "vertical arming switch") is open when probe 10 is oriented with nose cone 36 facing generally upward, and is closed when the probe is oriented such that nose cone 36 faces generally downward. Mercury switches 108 are fixedly attached to motor assembly 24 on a slight angle and are approximately equally radially spaced about the circumferences of cavity 42. Mercury switches 108 are open whenever nose cone 36 of probe 10 faces generally downward but at least one of the switches will close whenever the position of the nose cone deviates from the downward direction by a predetermined angle in any direction. Switches 108 close if probe 10 encounters turbulence in its descent which changes its pitch from the vertical direction.

Transmitter 30 and motor 84 are thus electrically actuated only when nose cone 30 faces generally downward but is disturbed from a directly vertically downward position (such as will occur when the probe encounters turbulence in traveling from position a to position b as shown in FIG. 1). Those skilled in the art will recognize many other ways to detect turbulence or other disturbances in the water as probe 10 descends (such as by use of a liquid damped disc-shaped mercury switch, acoustical sensors, pressure sensors, heat sensors, proximity detectors, light level detectors, etc.). Mercury switches 106 and 108 are used for cost-effectiveness in the preferred embodiment, but the present invention should in no way be limited to this configuration for sensor array 28. For instance, a gyroscopic sensing device might be used to detect deviations in the trajectory of probe 10; a sonar system or optical, infrared or acoustic sensors might be used to detect the presence of objects or motion, etc).

A switch 116, which is closed whenever motor assembly 24 is moved to its second position (i.e. nearer to tail section 34), is connected in parallel with sensor array 28. Switch 116 connects both transmitter 30 and motor 84 to battery pack 86 whenever the motor assembly 24 is in its second position (as shown in FIG. 4) no matter what the orientation the probe 10. Switch 116 in the preferred embodiment comprises a wiper contact 118 projecting from motor assembly housing 94 and a strip contact 120 (such as metallic tape or a metal strip) adhering to the inner wall of sleeve 50. Alternatively, if sleeve 50 comprises an electrically conductive material such as steel, contact 120 can be provided by the sleeve itself. An alternate arrangement comprises a microswitch disposed within sleeve 50 so that it will close whenever motor assembly 24 is moved to its second position. Those skilled in the art will readily be able to devise other ways to complete an electrical circuit whenever motor assembly 24 is moved to its second position.

When probe 10 is initially deployed, it will strike the surface 16 of water 12 with nose cone 36 facing downward (due to the aerodynamic effect of fins 48 as well as the moment caused by the relatively forward location of the center of gravity of the probe due to the initial position of motor assembly 24 in its first position). During this time, switch 106 is closed so that any substantial deviation in the axial position of probe 10 from vertical causes at least one of mercury switches 108 to also close (thereby actuating transmitter 30 and motor 84). Upon striking the surface, some deviation in the axial position of probe 10 from a vertical position will naturally occur due to surface tension, thereby causing motor 84 to rotate. Threads 100 of first output shaft 88 will partially disengage to an extent from wall portion 98. However, when first output shaft 88 is initially engaged with wall portion 98, shaft 90 is rotated several extra turns in order to compensate for this effect.

Once probe 10 has descended beneath the surface of water 12, only a few turns of shaft 88 by motor 84 will be necessary to disengage the shaft from wall portion 98. If probe 10 encounters disturbances or turbulence of any sort (such as that created by a traveling school of fish or a moving submarine), one or more of switches 108 will close, thereby completing a circuit between motor 84 and battery pack 86. First output shaft 88 rotates the extra number of turns necessary to disengage it from wall portion 98, and spring 96 forces motor assembly 24 down to its second position.

When motor assembly 24 moves to its second position (as shown in FIG. 4), the center of gravity of probe 10 shifts so that nose cone 36 is directed upward. Ballast 64 is jettisoned from cavity 60 (by the force of gravity), and the density of probe 10 is decreased to less than that of water 12. Probe 10 is now buoyant, and floats to the surface 16 of water 12 (position of FIG. 1). Simultaneously, switch 116 closes, causing motor 84 to continuously rotate second output shaft 90 and its associated cutting head 92. Cutting head 92 protrudes through opening 54 and begins cutting through plug 62. Meanwhile, the closing of switch 116 also actuates transmitter 30 so that antenna 32 begins radiating radio frequency energy. Once probe 10 reaches the surface of water 112, an airplane flying overhead or a surface ship also traveling over the surface of water 12 may detect the signals emitted by probe 10, thereby locating the disturbance beneath the surface of the water.

Probe 10 continues transmitting until cutting head 92 cuts through plug 62. After a time interval determined by the speed of motor 84, the sharpness of cutting head 92, the hardness of plug 62 and the spring constant of spring 96, cutting head 92 completely cuts an orifice through plug 62. As shown in FIG. 5, the force of the vacuum contained by cavity 26 draws water up through openings 66 and 54 and into the inside of sleeve 50. Protrusions 95 extend from motor assembly housing 94 to raise motor assembly 24 away from extremity 56 of sleeve 50, thereby providing clearance for the flow of water 12 (in conjunction with the difference in diameters of cutting head 92 and output shaft 90, the cutting head in the preferred embodiment having a larger diameter than the shaft and therefore cutting a hole in plug 62 which is much larger than the shaft). Water flows through vent holes 58 to fill cavity 26, and from there, through passages 44 into cavity 40. Thus, cavities 26, 40 and 42 as well as the inside of sleeve 50 are all filled with water by the combined effect of the vacuum, surface waves and wind. The density of probe 10 is increased to a density greater than that of water 12, and the probe descends beneath the surface of water 12 until it finally rests on sea floor 18 (position e of FIG. 1). In this way, probe 10 "self-destructs" (i.e. it scuttles itself) and will remain forever on sea floor 18.

If probe 10 fails to encounter turbulence or disturbances in its initial downward travel into water 12, it will come to rest on sea floor 18. If the depth of sea floor 18 is great enough, the ambient water pressure will cause an implosion of the walls of probe 10, thereby destroying the probe. If the depth of sea floor 18 is not great enough, probe 10 will come to rest horizontally on the sea floor where it will be buffetted about by currents for a time, finally causing both switch 106 and one of switches 108 to be closed for a sufficient period of time to cause output shaft 88 to disengage from wall portion 98. Ballast 64 is retained within chamber 60 by end wall 67 in this horizontal position so that probe 10 is not buoyant. Motor assembly 24 will move to its second position, switch 116 will close, cutting head 92 will cut through plug 62, and water will be drawn through ballast 64 into the cavities of the probe to ensure that it will never become buoyant.

Hundreds of probes 10 may be deployed at once over a large area of the sea, and conventional radio location equiment can be used to precisely locate the probes which surface. In this way, vast regions can be surveyed for underwater activity from a single monitoring station.

While the invention has been described in connection with what is presently conceived to be the most practical and preferred embodiment, it is to be understood that the invention is not limited to the disclosed embodiment but on the contrary, is intended to cover various modifications and equivalent arrangements. For instance, probe 10 need not incorporate a radio transmitter, but may be located optically (such as by a flashing beacon lamp at night time or by a highly reflective outer surface of nose cone 36 during daytime conditions), infrared, acoustic or microwave transmissions, etc. Likewise, as mentioned previously, sensor array 28 need not comprise mercury switches, but may sense any underwater disturbance (such as acoustic disturbances, infrared disturbances, pressure disturbances, etc.). Probe 10 need not be deployed from an aircraft 14, but instead may be deployed in a variety of other ways (as previously discussed). Probe 10 need not self-destruct by taking on water, but instead could include an explosive charge connected to a timer which ruptures the walls of the probe a predetermined time after the probe rises to the surface 16 of water 12. Alternatively, a water pump or some other device or method for filling probe 10 with water could be used. Probe 10 could include an on-board sophisticated control system (incorporating a microprocessor or other electronics) to control timing of different functions, or to preform analysis of measurements (in conjunction with extra sensors). Indeed, the present invention need not be limited to the use of detecting disturbances, but could be advantageously used for a variety of sounding and measurement applications (such as, for example, water temperature and pressure measurement, depth sounding, tracking of the velocity and direction of underwater currents, etc.). Accordingly, the invention is intended to cover all such modifications and equivalent arrangements included within the spirit and scope of the appended claims, which scope is to be accorded the broadest interpretation of such claims so as to encompass all such equivalent structures and methods.

What is claimed:

1. A body adapted for submersion into a fluid for detecting the presence of disturbances beneath the surface of said fluid, said body comprising:

ballast means, detachably disposed on said body, for causing said body to have a density exceeding the density of said fluid such that said body descends into said fluid in a first predetermined orientation along a trajectory determined by the force of gravity, said ballast means detaching from: said body when said body assumes a second predetermined orientation different from said first predetermined orientation to cause said body to have a density less than the density of said fluid;

first sensing means for sensing deviations in the descent of said body from said trajectory due to a disturbance in said fluid;

means for defining a watertight chamber, said chamber initially containing a compressible gas; and unitary means, responsive to said sensed deviations, for:
  changing the orientation of said body from said first orientation to said second orientation when the quantity of said sensed deviations over time exceeds a predetermined amount, thereby causing said body to float to the surface; and
  filling said chamber with said fluid a predetermined time after said body floats to said surface, thereby increasing the density of said body to greater than the density of said fluid to cause said body to descend into said fluid,
wherein said unitary means includes:
motor means, disposed within said chamber and movable between a first and a second position, the position of said motor means determining the center of gravity of said body, said body assuming said first orientation when said motor means is in said first position and assuming said second orientation when said motor means is in said second position, said motor means for determining the orientation of said body and for producing rotational energy in response to said sensed deviations;
position retaining means, coupled to said motor means and engagable with said body, for engaging with said body to retain said motor means in said first position and for disengaging from said body when said motor means produces a first predetermined angular displacement;
biasing means for biasing said motor means toward said second position; and
cutting means, rotationally coupled to said motor means, for cutting an orifice in a wall of said body separating said chamber from said fluid when said motor means produces a second predetermined angular displacement when in its second position.

2. A body as in claim 1 wherein:
said first sensing means includes means for sensing deviations in the orientation of said body from said first orientation; and
said body further includes switching means for actuating said motor means when said motor means is in said second positon.

3. A body as in claim 1 further including transmitting means for emitting a signal when said body floats to the surface.

4. An apparatus for detecting the presence of turbulence in a fluid, said apparatus comprising an elongated body adapted for submersion in said fluid, said body having an initial density exceeding the density of said fluid such that said body descends along a trajectory beneath the surface of the fluid due to the force of gravity, said body comprising:
means for defining an evacuated watertight chamber substantially axially disposed within said body, said chamber-defining means including means for defining a wall having a first surface disposed within said chamber and a second surface in contact with said fluid;
motor means, disposed within said chamber and movable to at least a first and a second position, the position of said motor means changing the center of gravity of said body such that a first extremity of said body is directed toward the surface when said motor means is in said first position and a second extremity of said body is directed toward the surface when said motor means in in said second position, said motor means for producing rotational energy in a first direction in response to at least one electrical signal;
a first output shaft, rotationally coupled to said motor means, said first output shaft including means for defining a plurality of threads;
threaded engaging means, disposed within said chamber, for engaging with the threads of said first output shaft to retain said motor means in said first position, said threads disengaging from said engaging means when said first output shaft rotates in said first direction a predetermined number of turns;
first sensing means for producing a first electrical signal in response to deviations in the descent of said body from said trajectory, said motor means responsive to said first electrical signal;
biasing means for biasing said motor means toward said second position;
ballast means, detachably disposed on said first extremity of said body, for detaching from said body when said motor means moves to said second position, thereby decreasing the density of said body to less than that of said fluid to cause said body to float to said surface;
switching means for producing a second electrical signal when said motor means is in said second position, said motor means responsive to said second electrical signal;
transmitting means, responsive to said second electrical signal, for transmitting a signal for a predetermined time interval after said body floats to said surface; and
a second output shaft, rotationally coupled to said motor means, said second output shaft including means for cutting an orifice in said wall to at least partially fill said chamber, said fluid flowing through said orifice to cause said body to have a density exceeding the density of said fluid, said cutting means cutting said orifice once said motor means is in said second position and produces rotational energy.

5. An apparatus as in claim 4 wherein said first sensing means senses deviations in the orientation of the axis of the said body defined by the direction of elongation.

6. An apparatus as in claim 4 further including second sensing means, connected in series with said first electrical signal, for passing said first electrical signal to said motor means only when said first extremity of said body is directed vertically upward toward the surface.

7. An apparatus as in claim 4 wherein:
said body includes means for defining a cavity disposed in the first extremity of said body; and
said ballast means is disposed in said cavity.

8. A method for detecting a presence of disturbance beneath the surface of a fluid, comprising the steps of:
disposing a body into said fluid, said body including ballast means, detachably disposed on said body, for causing said body to have a density exceeding the density of said fluid such that said body descends into said fluid in a first predetermined orientation along a trajectory determined by the force of gravity;
sensing deviations in the path of descent of said body from said trajectory due to disturbance in said fluids;
changing the orientation of said body from said first orientation to a second orientation different from said first orientation when the quantity of said sensed deviations over time exceeds a predetermined amount, said ballast means detaching from said body when said body assumes said second orientation, to cause said body to float to the surface; and filling a watertight chamber disposed within said body with said fluid a predetermined time after said body floats to said surface, thereby increasing the density of said body to greater than the density of said fluid to cause said body to descend into said fluid, said orientation changing step includes the step of changing the position of a motor from a first position to a second position, the position of said motor determining the center of gravity of said body, said body assuming said first orientation when said motor is in said first position and assuming said second orientation when said motor is in said second position; and said filling step includes the step of rotating a cutting device, rotationally coupled to said motor, said rotating cutting device cutting an orifice in a wall of said body separating said chamber from said fluid as said motor rotates in said second position.

9. A method as in claim 8 further including the step of emitting a signal for a first predetermined time interval after said body rises to the surface of the fluid.

10. A method as in claim 8 wherein said motor position changing step includes the steps of:

biasing said motor towards said second position; and disengaging a position retaining device engaged with said body and retaining said motor in said first position, said position retaining device disengaging from said body when said motor produces a first predetermined angular displacement in response to said sensed deviations.

11. A method as in claim 10 wherein:

said sensing step includes the step of sensing deviations in the orientation of said body from said first orientation; and further including the step of causing said motor to rotate whenever said motor is in said second position.

12. A method as in claim 8 further including the step of emitting a signal when said body floats to the surface.

13. A method for detecting the presence of turbulence in a fluid comprising the steps of:

disposing into said fluid an elongated body having an initial density exceeding the density of said fluid such that said body descends along a trajectory beneath the surface of the fluid due to the force of gravity, the center of gravity of said body located such that a first extremity of said body is directed toward the surface of said fluid as said body descends;

rotating a first output shaft in a first direction in response to deviations in the position of said body for said trajectory, said first output shaft including means for defining a plurality of threads, said body including engaging means for engaging with said threads, said threads disengaging from said engaging means when said first output shaft rotates a predetermined number of turns in said first direction, a mass attached to said first output shaft;

shifting the position of said mass relative to said body to change the center of gravity of said body such that a second extremity of such body is directed toward the surface of said fluid when said threads disengage from said engaging means;

detaching a quantity of ballast from said body when said second extremity is directed toward the surface, thereby decreasing the density of said body to less than that of said fluid to cause said body to float to said surface;

transmitting a signal when said body floats to said surface; and filling an initially empty watertight chamber defined within said body with said fluid a second predetermined time interval after said body floats to said surface, said body including means for defining said watertight chamber, said filling step causing the density of said body to exceed the density of said fluid to cause said body to descend below the surface of said fluid.

14. A method as in claim 13 wherein said mass comprises an electrical motor, and said shifting step comprises the step of moving said electrical motor from a first position to a second position under the force of a spring, said motor rotationally connected to said first output shaft and producing rotational energy to perform said rotating step.

15. A method as in claim 14 wherein said filling step includes a step of rotating a second output shaft in a first direction, said second output shaft connected to said motor, said second output shaft including means for cutting an orifice in a wall of said body separating said chamber from said fluid when said motor is in said second position.

16. A method as in claim 13 wherein said filling step includes the step of cutting an orifice in a wall of said body, said wall separating said chamber from said fluid.

17. A method as in claim 13 wherein said rotating step includes the step of sensing deviations in the orientation of the axis of said body defined by the direction of elongation of said body.

18. A method as in claim 17 wherein said deviation sensing step includes the step of sensing deviations in said axis of elongation from the vertical direction.

* * * * *